United States Patent

[11] 3,547,160

| [72] | Inventor | Jack L McLarty<br>Milwaukee, Wis. |
| --- | --- | --- |
| [21] | Appl. No. | 787,710 |
| [22] | Filed | Dec. 30, 1968 |
| [45] | Patented | Dec. 15, 1970 |
| [73] | Assignee | Universal Oil Products Company<br>Des Plaines, Ill.<br>a corporation of Delaware |

[54] FLEXIBLE CORRUGATED FILAMENT WOUND TUBE
8 Claims, 6 Drawing Figs.

[52] U.S. Cl. .................................................. 138/121
[51] Int. Cl. ............................................. F16l 11/108

[50] Field of Search .......................................... 138/121, 122, 123, 137; 161/125

[56] References Cited
UNITED STATES PATENTS

| 2,371,991 | 3/1945 | Harding | 138/121 |
| 2,897,840 | 8/1959 | Roberts | 138/122 |
| 2,991,808 | 7/1961 | Siegmann et al. | 138/137 |
| 3,047,026 | 7/1962 | Kahn | 138/137 |

*Primary Examiner*—Henry S. Jaudon
*Attorneys*—James R. Hoatson, Jr. and Philip T. Liggett

ABSTRACT: A flexible corrugated filament wound tube, such as an automobile radiator hose, comprised of wound filaments or fibers set in a plastic.

PATENTED DEC 15 1970 3,547,160
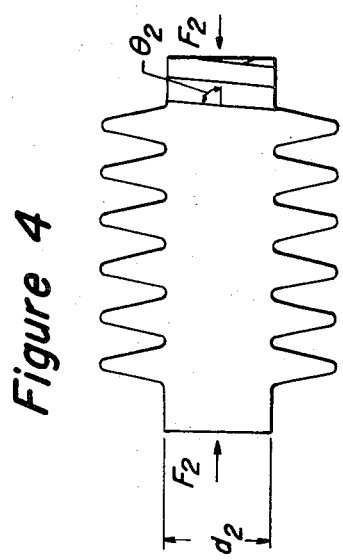
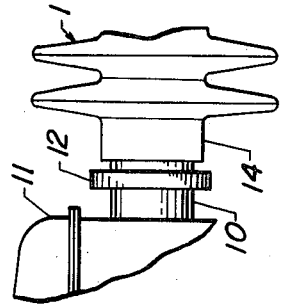
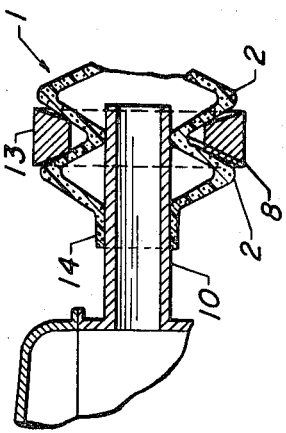
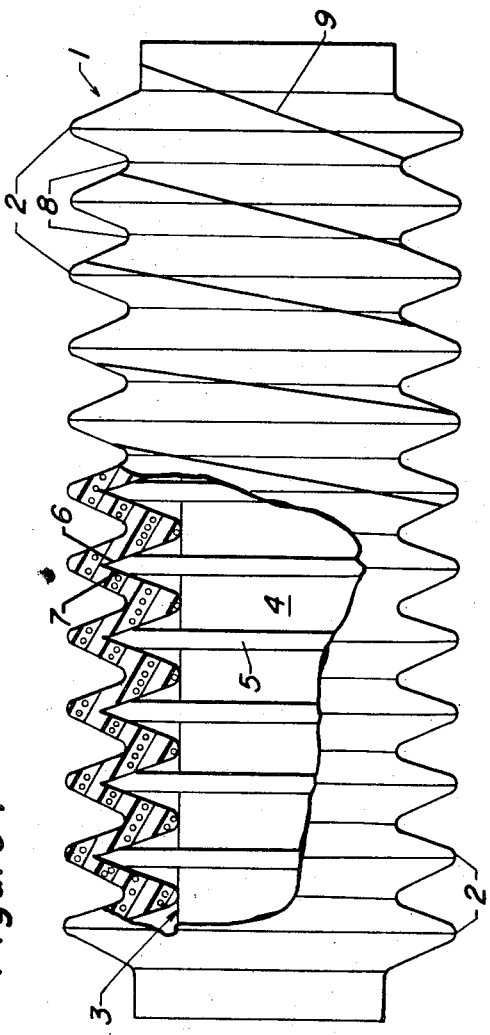
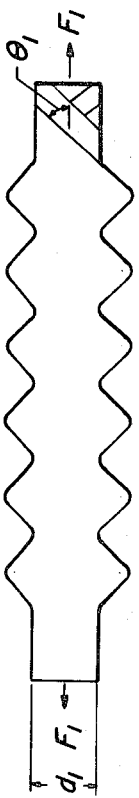
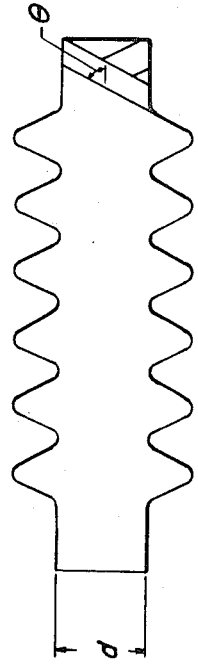
INVENTOR:
Jack Lowrie McLarty
BY: James R. Hoatson, Jr.
Philip T. Liggett
ATTORNEYS

FLEXIBLE CORRUGATED FILAMENT WOUND TUBE

This invention relates to a flexible corrugated filament wound tube. More particularly, this flexible filament wound tube is designed for use as a hose for forming a tightly sealed connection between two pipe sections.

A primary use of this flexible corrugated tube is as a radiator hose in a vehicle having a water cooled engine. Some of the many other uses in which this flexible corrugated tube can be utilized are as connecting sections in steam boiler systems, as connecting hoses in air brakes, and as connecting lines and vibration damping sections in liquid pumping systems, such as water filtration plants, or in underwater vehicles.

A primary object of this invention is to provide a tube which is flexible for ease of connection and disconnection, but which has sufficient strength to resist large internal pressures, external pressures, and longitudinal forces. The hose, or tube, is corrugated to retain flexibility and improve strength. Furthermore, corrugation gives the tube stiffed ribs to maintain the bore of the tube in a reasonably open condition when the tube is bent or curved along its length.

Another object of this invention is the construction of a tube in a form to promote self-locking of the tube ends around pipe ends to which the tube is connected. The tube grasps a pipe when a longitudinal tensile force is applied at the tube end. The tube can be made to readily release a pipe by applying a longitudinal compressive force on the tube end.

Yet, another object of the invention is to provide a corrugated hose or tube wherein the vertices, or deepest portions of the furrows between the corrugations or ridges, are rounded to maintain the bore of the tube in a reasonably open state even when the tube is subjected to bending or flexing.

The novel features that characterize this invention include the materials used in the construction of the flexible corrugated tube, the manner of filament winding which gives the tube both strength and flexibility, the grasping action of the tube ends when in tension and the releasing action of the tube ends in compression, and the ability to use only one machine for the complete fabrication process.

In a broad aspect this invention is a flexible corrugated tube, comprised of filaments set in plastic, and having ridges extending transversely about the outer wall of the tube, and grooves, corresponding to said ridges, extending transversely into the inner wall of said tube, whereby said ridges and said grooves correspond in longitudinal disposition and extend radially outward from the tube axis. The filaments or fibers may be in the form of a spiral, similar to a screw thread, or in the form of circular hoops which vary in diameter from the ridges to the apexes or vertices of the furrows between the ridges. In a preferred embodiment of the tube of this invention the filaments are spirally wound. Normally the filaments are spirally wound at a pitch which is substantially uniform throughout the length of the tube, and the ridges are spaced at a substantially uniform pitch throughout the length of the tube. The preferred ratio of the pitch of filament winding to the pitch of ridge spacing is about 1.3 to 1. While there may be considerable latitude in pitch ratios as between filament winding and ridge spacing, a tube in which this ratio increases beyond about 8 to 1 will lose most of its flexibility. Conversely, a tube in which the pitch ratio falls below about .1 to 1 will have little longitudinal strength to resist axial forces acting on the tube but will resist large radial forces. A flexible corrugated tube constructed with the preferred pitch ratio will have sufficient rigidity to resist tensile forces resulting either from tensile stress on the tube or internal radial pressure within the tube. At the same time, the tube will retain sufficient flexibility to be readily attachable to and detachable from fixed pipe ends.

The term plastic, as used to describe the material in which the filaments are set, may be defined as a material that contains as an essential ingredient an organic substance of large molecular weight, is solid in its finished state, and at some stage in its manufacture or in its processing into finished articles, can be shaped to flow. This definition includes rubber as well as other elastomers. While a great number of possible materials may be used in the construction of the flexible corrugated tube, some common constructions are flexible fibers of fiberglass or nylon set in a composition containing an epoxy resin and a curing agent, such as a polyamine or polyanhydride hardener, filaments of nylon or fiberglass set in a composition containing a polyester resin and a curing agent, such as styrene, and fiberglass filaments set in either natural or synthetic rubber.

The various features of the flexible corrugated tube of this invention are more clearly illustrated in the attached drawings in which:

FIG. 1 is a partially cut-away side view of the preferred embodiment of this invention as positioned about a mandrel upon which it is constructed.

FIG. 2 is an exaggerated schematic diagram showing the grasping feature of the ends of a flexible corrugated tube while in a state of axial tension.

FIG. 3 is an exaggerated schematic diagram showing the flexible corrugated tube of FIG. 2 is a relaxed state.

FIG. 4 is an exaggerated schematic diagram showing the feature of ready release of the ends of the flexible corrugated tube of FIGS. 2 and 3 when in a state of axial compression.

FIG. 5 is an isolated view showing the preferred embodiment of the flexible corrugated tube with a washer for unclamping the tube from a pipe.

FIG. 6 is a sectional isolated view showing the flexible corrugated tube clamped to a pipe using a ring.

Referring now to FIG. 1 there is shown a flexible corrugated tube 1 having ridges 2 extending radially outward from the axis of tube 1. In the partially cutaway portion there is visible a mandrel assembly 3 upon which the flexible corrugated tube is constructed. Mandrel assembly 3 is comprised of a center mandrel 4 having ends (not visible) which are engageable in a filament winding machine. Transversely about and at uniform longitudinal internals along mandrel 4 are annular discs 5 fastened to mandrel 4. The peripheral portions of annular discs 5 narrow acutely to edges 6 so that as the outer ridges 2 of tube 1 are constructed, corresponding grooves 7 are produced extending transversely into the inner wall of the flexible corrugated tube 1. The layers of flexible fibers set in plastic which form the flexible corrugated tube extend radially outward from the tube axis at discs 5, thereby forming ridges 2 as previously described. On the outer surface of the flexible corrugated tube 1, and between adjacent ridges 2 are furrows 8. The apexes or vertices of furrows 8 do not form acute angles, but instead are rounded so as to prevent flexible corrugated tube 1 from kinking when twisted or bent.

In the construction of flexible corrugated tube 1 the mandrel assembly 3 is mounted on a filament winding machine. The mandrel assembly rotates while the filament winding machine spirally winds filaments about the mandrel assembly. The filaments which are wound about the mandrel assembly are coated with a settable liquid plastic. For example, nylon filaments may first be coated with a composition containing an epoxy resin and a polyanhydride hardener, then wound about mandrel assembly 3. The spiral winding is accomplished by feeding the filaments from a device on the filament winding machine which traverses the length of the mandrel assembly 3. This method of spirally winding a tubular article is common in the art of helically winding filament fibers.

After the winding operation is completed, the mandrel assembly 3 with flexible corrugated tube 1 positioned thereon is removed from the filament winding machine and the flexible corrugated tube 1 is allowed to cure. The mandrel 4 is then axially withdrawn from annular discs 5 and flexible corrugated tube 1.

There are several ways of extracting the discs 5 from flexible corrugated tube 1. The discs 5 may be constructed of sand, clay, salt or any other material which may be formed into a reasonably rigid shape when dry, but which will dissolve, decompose, or lose cohesiveness when contacted with water. If this construction of the annular discs 5 is used, water need merely be forced through the flexible corrugated tube 1 and the discs 5 will be washed out of the tube. The flexible corrugated tube 1 will then be ready for use. Where the ridges and grooves are so shaped that the tube is in the form of a continuous helix, a flexible linear material may be used in place of a series of discs 5. This linear material may be helically wound about mandrel 4 prior to the construction of the flexible corrugated tube. Once mandrel 4 is withdrawn after construction of the tube, the linear material may easily be pulled free from the flexible corrugated tube.

In FIG. 1, the spiral winding of flexible corrugated tube 1 is illustrated by tracing the winding path of a single filament 9. It can be seen that the pitch of filament winding, that is the longitudinal distance between loops of the filament 9, is about 1½ times as great as the pitch, or distance between successive ridges 2, which are placed at substantially uniform intervals along the length of tube 1. Filament 9 is spirally wound at a constant winding angle, thereby maintaining a substantially uniform pitch throughout the length of the tube. A ratio of the pitch of filament winding to the pitch of ridge spacing of about 1.3 to 1 provides sufficient flexibility of the flexible corrugated tube 1 while still maintaining adequate longitudinal rigidity.

The self-locking feature of the tube or hose ends is illustrated schematically in FIG. 2. A tensile force $F_1$ is applied to the tube, thereby lengthening it and reducing the diameter at the ridges as well as the basic inner diameter $d_1$ of the tube. The basic inner diameter is the inner diameter at the tube ends. The spirally wound filaments are illustrated at the right end of the tube as being biased by force $F_1$ in an axial or longitudinal direction so that the elevational projection of the filament at the axis is at an angle $\theta_1$ with respect to an elevational projection of the tube axis. The reduced diameter $d_1$ resulting from the axial biasing of the filament fibers effectively forces the ends of the tube to grasp the ends of any pipes which the tube may be used to connect. In actual use, an axial tensile force will result from any bending or twisting of the tube, such as is common in hoses used to connect the engine to the radiator in an automobile, truck, or other water cooled vehicle. When the tube is so utilized, any attempt to remove a tube end from a pipe by pulling on the tube will merely result in the tube end grasping the pipe with increased force.

As can be seen in FIG. 3, removal of the axial tensile force will have several effects. The projected angle of filament alignment with respect to the tube axial increases from $\theta_1$ to $\theta$ and the end diameter of the tube is enlarged from $d_1$ to $d$. These same effects are even more pronounced when an axial compressive force $F_2$ is applied to the pipe, as in FIG. 4. In FIG. 4 the projected angle of filament alignment with respect to the tube axis increases from $\theta$ to $\theta_2$ and the tube diameter is enlarged from $d$ to $d_2$. As used in the cooling system of an automobile or truck, there are no axial compressive forces commonly applied to the tube except for the purpose of removing the tube. A tube put to such a use therefore, will not be subject to undesired enlargement of diameter and consequent leakage at the tube ends. Instead, the grasping feature previously described will allow the tube of this invention to be used as a radiator hose, often without the necessity of clamping means to bind the tube to the pipe ends. To initially position the tube for use as a radiator hose, the tube end may be compressed and worked onto a pipe extension. When the compressive force on the tube is released, the diameter of the tube will decrease, thereby locking the tube to the pipe. This same method of fastening the tube end is repeated at the other end of the tube with the same result. When it is desired to remove the tube from the pipe, a force to push the tube off of the pipe need merely be applied at the tube end toward the middle of the tube. The tube diameter will increase and the tube is easily separated from the pipe.

The explanation of the self-locking feature in the pipe is that while filaments of the pipe are cross-connected by the intermolecular bonds of the plastic in which the filaments are set, the bonds between filaments may be stretched within the elastic limit of the plastic. These bonds are stretched when either a compressive or tensile axial force is applied to the tube. The forces within the tube tending to cause the plastic cross links to assume their original dimensions cause the tube to return to its unstressed condition from either a compressed or elongated condition.

The extent of the variance in diameter of a tube between a stressed and unstressed condition may be determined from the projected angle of winding of the filaments for the tube in the unstressed condition. The greater the angle of winding, the less will be the effect on the tube diameter of tensile and compressive forces on the tube. At the maximum projected angle of filament winding with respect to the tube axis, which is 90°, the tube would not be spirally wound with filaments but instead would be encircled by hoops of filament fibers. Axial tensile and compressive forces would have no effect on the tube diameter in this situation. Conversely, the smaller the angle of filament winding, the more pronounced will be the effect of tensile and compressive forces on the tube diameter.

In the practical utilization of the features of grasping in tension and ready release in compression, the flexible corrugated tube of this invention is often used in conjunction with certain accessories which are used to induce grasping and ready release. FIG. 5 is an isolated view of flexible corrugated tube 1 fitted onto a pipe 10 which protrudes from the upper portion of an automobile radiator 11. A large annular metal ring or washer 12 is positioned around pipe 10. The washer 12 fits loosely enough around pipe 10 so as to be easily movable in an axial direction. The outer diameter of washer 12 is sufficiently large so that one of the transverse surfaces of washer 12 can be pushed against the transverse surface of the end 14 of flexible corrugated tube 1.

To remove tube 1 from around pipe 10, a screw driver or other lever is inserted into the space separating washer 12 from radiator 11. The radiator serves as a fulcrum, and washer 12 is pushed longitudinally along pipe 10 away from radiator 11. This provides a compressive force distributed with some uniformity about the end of flexible tube 1 with resultant effects on tube 1 as illustrated in FIG. 4.

FIG. 6 illustrates, in section, the converse situation. In FIG. 6, flexible tube 1 is again shown fitted onto pipe 10 which protrudes from the upper portion of radiator 11. In this instance, however, an annular metal ring 13 is positioned circumferentially about flexible tube 1 in the furrow 8 between two adjacent ridges 2. Ring 13, as illustrated is an unbroken ring having a wedge shaped cross section. Ring 13 is moved into the position illustrated by first being positioned about pipe 10 circumferentially around end 14 of flexible tube 1. A tensile force is then exerted on tube 1 axially away from radiator 11. This tensile force causes end 14 of tube 1 to grasp pipe 10 and also causes the first ridge 2 adjacent to end 14 to flatten out so that ring 13 may be slipped axially away from radiator 11 and over said first ridge 2 into the position illustrated. The initial tensile force is removed and the ridges 2 rise radially outward from the tube axis, whereupon the sloping sides of ring 13 exert a force on the sides of ridges 2. The forces which the sloping sides of ring 13 exert on ridges 2 have the same effect as would a tensile force acting axially on tube 1. That is, the forces exerted by ring 13 tend to flatten out ridges 2 and decrease the diameter of the tube 1 at end 14, thereby causing end 14 to firmly grasp pipe 10.

While only one form of ring 13 is illustrated, any substantially annular conventional clamping means may be used with the same effect. A ring or other clamping means while not always necessary to secure the flexible tube to a pipe, does reinforce the grasping effect which is induced in the tube by tensile forces acting on the tube.

In the preferred construction of the flexible corrugated tube of this invention the ends of the tube are of uniform cross section. As is familiar in the art of filament winding, and as is illustrated in FIGS. 2, 3 and 4, the filaments reverse axial direction of spiral winding at the tube ends in the transition from one layer of filaments to another.

The detailed description of the preferred embodiment of this invention has been given for clearness of understanding only, and no unnecessary limitations should be construed

I claim:

1. A flexible corrugated tube, comprised of spirally wound, continuous filaments set in a plastic, and having ridges extending transversely about the outer wall of the tube, and grooves, corresponding to said ridges, extending transversely into the inner wall of said tube, whereby said ridges and said grooves correspond in longitudinal disposition and extend radially outward from the tube axis, said filaments being wound at a pitch which is substantially uniform throughout the length of the tube, said ridges being spaced at a substantially uniform pitch throughout the length of the tube, the ratio of the pitch of filament winding to the pitch of ridge spacing being about 1.3 to 1.

2. The corrugated tube of claim 1 further characterized in that the ends of the tube are of uniform cross section, and the filaments reverse axial direction of spiral winding at the tube ends.

3. The corrugated tube of claim 1 further characterized in that the aforesaid filament fibers are nylon and are set in a composition containing an epoxy resin and a curing agent.

4. The corrugated tube of claim 1 further characterized in that the aforesaid filament fibers are nylon and are set in a composition containing a polyester resin and styrene.

5. The corrugated tube of claim 1 further characterized in that the aforesaid filament fibers are fiberglass and are set in rubber.

6. The corrugated tube of claim 1 further characterized in that the aforesaid filament fibers are fiberglass and are set in a composition containing an epoxy resin and a curing agent.

7. The corrugated tube of claim 1 further characterized in that the aforesaid filament fibers are fiberglass and are set in a composition containing a polyester resin and a curing agent.

8. A flexible corrugated tube comprised of spirally wound, continuous filaments set in a plastic, and having ridges extending transversely about the outer wall of the tube, and grooves, corresponding to said ridges extending transversely into the inner wall of said tube, whereby said ridges and said grooves correspond in longitudinal disposition and extend radially outwardly from the tube axis, said filaments being wound at a pitch which is substantially uniform throughout the length of the tube, and said ridges being spaced at a substantially uniform but lesser pitch throughout the length of the tube.